United States Patent
Pugaczewski

(10) Patent No.: US 10,630,573 B2
(45) Date of Patent: Apr. 21, 2020

(54) MACHINE LEARNING FOR QUALITY OF EXPERIENCE OPTIMIZATION

(71) Applicant: CenturyLink Intellectual Property LLC, Broomfield, CO (US)

(72) Inventor: John T. Pugaczewski, Hugo, MN (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

(21) Appl. No.: 16/143,839

(22) Filed: Sep. 27, 2018

(65) Prior Publication Data
US 2020/0044955 A1  Feb. 6, 2020

Related U.S. Application Data

(60) Provisional application No. 62/713,396, filed on Aug. 1, 2018.

(51) Int. Cl.
*H04L 12/751* (2013.01)
*H04L 12/24* (2006.01)
(Continued)

(52) U.S. Cl.
CPC .......... *H04L 45/08* (2013.01); *H04L 41/0826* (2013.01); *H04L 45/14* (2013.01);
(Continued)

(58) Field of Classification Search
None
See application file for complete search history.

(56) References Cited

U.S. PATENT DOCUMENTS

2003/0179717 A1* 9/2003 Hobbs .............. H04L 29/06
                                                      370/254
2009/0320019 A1* 12/2009 Ellington .............. G06F 8/71
                                                      717/177
(Continued)

FOREIGN PATENT DOCUMENTS

EP   2720409        4/2014
EP   2720409 A1 *  4/2014  ............. H04L 43/08
(Continued)

OTHER PUBLICATIONS

International Search Report and Written Opinion of the International Searching Authority, dated Mar. 22, 2019, Int'l Application No. PCT/US18/05603, Int'l Filing Date Sep. 27, 2018; 17 pgs.

*Primary Examiner* — Ayaz R Sheikh
*Assistant Examiner* — Faiyazkhan Ghafoerkhan

(57) ABSTRACT

Novel tools and techniques for machine learning based quality of experience optimization are provided. A system includes one or more network elements, an orchestrator, and a server. The server may further include a processor and non-transitory computer readable media comprising instructions executable by the processor to obtain telemetry information from a first protocol layer, obtain telemetry information from a second protocol layer, modify one or more attributes of the second protocol layer, observe a state of first protocol layer performance, assign a cost associated with changes to each of the one or more attributes of the second protocol layer, and optimize the first protocol layer performance based, at least in part, on the state of first protocol layer performance and the cost associated with the changes to one or more attributes of the second protocol layer. The orchestrator may be configured to modify the one or more attributes of the second protocol layer.

20 Claims, 8 Drawing Sheets

(51) Int. Cl.
*H04L 12/721* (2013.01)
*H04L 12/801* (2013.01)
*H04L 12/873* (2013.01)
*H04L 29/08* (2006.01)

(52) U.S. Cl.
CPC ............ H04L 45/66 (2013.01); H04L 47/196 (2013.01); H04L 47/522 (2013.01); H04L 67/22 (2013.01)

(56) References Cited

U.S. PATENT DOCUMENTS

| | | | | |
|---|---|---|---|---|
| 2014/0033242 A1* | 1/2014 | Rao | ...................... | H04N 21/442 |
| | | | | 725/14 |
| 2014/0160941 A1* | 6/2014 | Hui | ...................... | H04W 24/10 |
| | | | | 370/241 |
| 2014/0282586 A1* | 9/2014 | Shear | ................... | G06F 16/245 |
| | | | | 718/104 |
| 2015/0066929 A1* | 3/2015 | Satzke | ................... | H04L 67/10 |
| | | | | 707/737 |
| 2016/0034305 A1* | 2/2016 | Shear | ...................... | G06F 16/245 |
| | | | | 707/722 |
| 2016/0266939 A1* | 9/2016 | Shear | ....................... | H04L 47/70 |
| 2016/0296840 A1* | 10/2016 | Kaewell | .............. | H04L 67/1002 |
| 2016/0315809 A1* | 10/2016 | McMurry | ........... | H04L 41/0886 |
| 2017/0215094 A1* | 7/2017 | Akoum | ................. | H04L 43/026 |
| 2018/0324204 A1* | 11/2018 | McClory | ................... | G06F 8/71 |
| 2018/0329744 A1* | 11/2018 | Shear | ................ | G06F 16/24575 |
| 2019/0042378 A1* | 2/2019 | Wouhaybi | ............ | G05B 19/042 |
| 2019/0147364 A1* | 5/2019 | Alt | ......................... | G06F 3/0611 |
| | | | | 706/12 |
| 2019/0215549 A1* | 7/2019 | Han | ...................... | G06K 9/6218 |
| 2019/0222491 A1* | 7/2019 | Tomkins | ............ | H04L 43/0852 |

FOREIGN PATENT DOCUMENTS

| | | | | |
|---|---|---|---|---|
| EP | 3197198 | | 7/2017 | |
| EP | 3197198 A1 * | | 7/2017 | ........... H04L 41/142 |

* cited by examiner

300

MACHINE LEARNING FOR QUALITY OF EXPERIENCE OPTIMIZATION

CROSS REFERENCE TO RELATED APPLICATIONS

This application claims priority to U.S. Provisional Patent Application Ser. No. 62/713,396 filed Aug. 1, 2018 by John T. Pugaczewski et al., entitled "Machine Learning for Quality of Experience Optimization," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to network performance optimizations, and more particularly to a machine learning agent for quality of experience optimizations.

BACKGROUND

Quality of experience (QoE) refers to the overall perception of a user of the quality of a telecommunications service. QoE, as in the field of user experience, often adopts a holistic approach to optimizing or improving a customer's experience with the various services. However, QoE typically relies on objective measures of performance, as in measures of quality of service (QoS), and relates these objective measures to a customer's perceived QoE. Conventionally, techniques for improving QoE have focused on observing telemetry and tuning parameters on a single protocol layer. Moreover, conventional algorithms used for optimization typically rely on rule-based logic, or manual tuning by a user or service provider.

Accordingly, tools and techniques for implementing machine learning-based QoE optimization systems are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
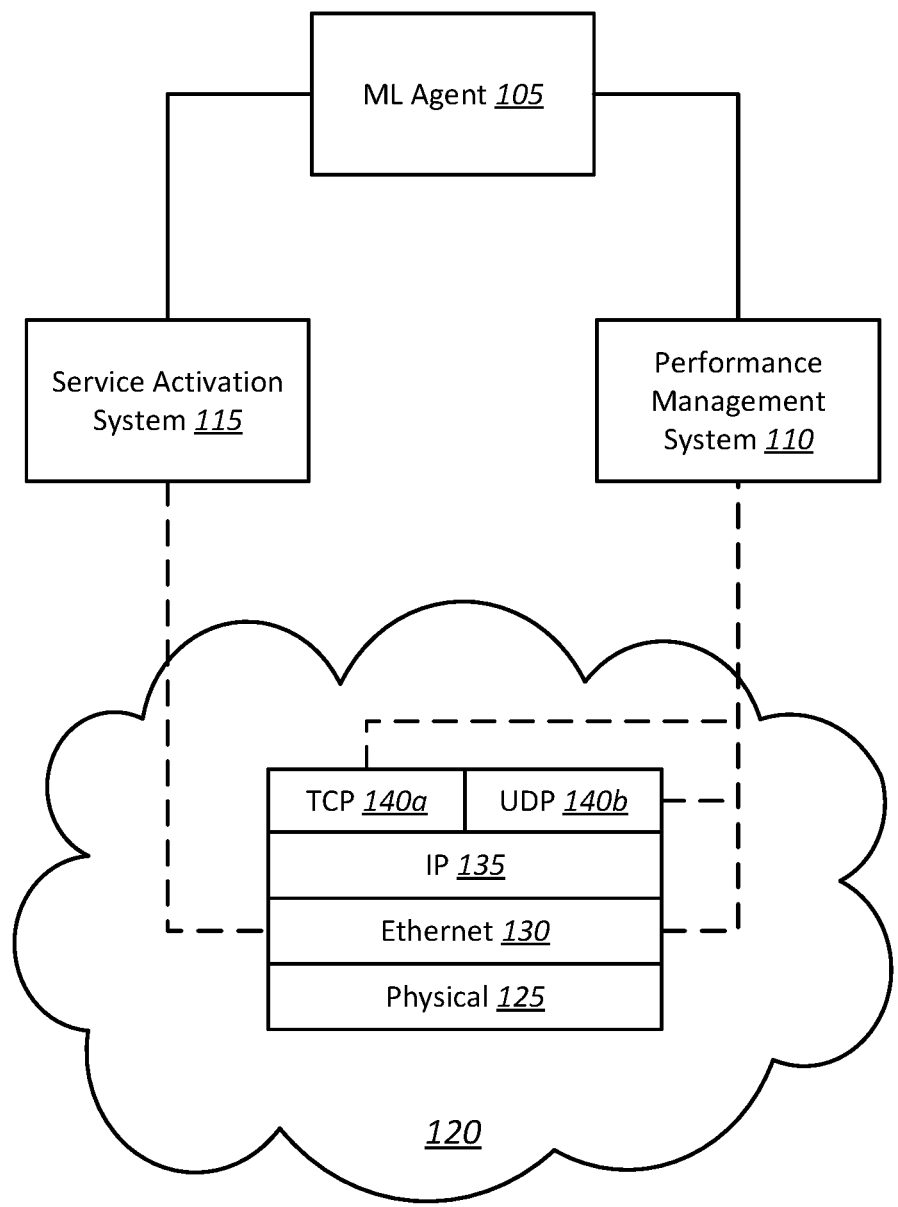
FIG. 1 is a schematic block diagram of an example architecture for machine learning QoE optimization, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for machine learning for QoE optimization may include one or more network elements, an orchestrator, and a server. The orchestrator may be coupled to the one or more network elements, and configured to modify at least one of the one or more network elements. The server may further include a processor and non-transitory computer readable media comprising instructions executable by the processor to perform various operations. For example, the instructions may be executable to obtain, via the one or more network elements, telemetry information from a first protocol layer, and obtain, via the orchestrator, telemetry information from a second protocol layer.

In various embodiments, based on the telemetry information from both the first and second protocol layers, the instructions may further be executable by the server to modify, via the orchestrator, one or more attributes of the second protocol layer. The server may then observe, via the orchestrator, a state of first protocol layer performance, and assign a cost associated with changes to each of the one or more attributes of the second protocol layer. The server may be configured to optimize the first protocol layer performance based, at least in part, on the state of first protocol layer performance and the cost associated with the changes to one or more attributes of the second protocol layer. The orchestrator may, in turn, be configured to modify the one or more attributes of the second protocol layer.

In another aspect, an apparatus for machine learning QoE optimization may include a processor and non-transitory computer readable media comprising instructions executable by the processor to perform various operations. In various embodiments, the instructions may be executable to obtain, via one or more network elements, telemetry information from a first protocol layer, and obtain, via an orchestrator, telemetry information from a second protocol layer. In various embodiments, based on the telemetry information from the first and second protocol layers, instructions may further be executable to modify, via the orchestrator, one or more attributes of the second protocol layer, observe a state of first protocol layer performance, and assign a cost associated with changes to each of the one or more attributes of the second protocol layer. The instructions may further be executable to optimize the first protocol layer performance based, at least in part, on the state of first protocol layer performance and the cost associated with the changes to one or more attributes of the second protocol layer.

In a further aspect, a method for machine learning QoE optimization may include obtaining, via one or more network elements, telemetry information from a first protocol layer, and obtaining, via an orchestrator, telemetry information from a second protocol layer. The method may continue by modifying, via the orchestrator, one or more attributes of the second protocol layer, observing, via the orchestrator, a state of first protocol layer performance, and assigning a cost associated with changes to each of the one or more attributes of the second protocol layer. The method may then continue by determining whether first protocol layer performance is optimized based, at least in part, on the state of first protocol layer performance and the cost associated with the changes to one or more attributes of the second protocol layer.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of an example architecture for a system 100 for machine learning QoE optimization, in accordance with various embodiments. The system 100 includes a machine learning (ML) agent 105, performance management system 110, service activation system 115, and network 120. The network 120 may include abstracted telemetry and attribute data from a physical layer 125, a link layer (e.g., Ethernet layer 130), networking layer (e.g., internet protocol (IP) layer 135), and transport layer 140 including a transmission control protocol (TCP) layer 140a and/or user datagram protocol (UDP) layer 140b. It should be noted that the various components of the system 100 are schematically illustrated in FIG. 1, and that modifications to the system 100 may be possible in accordance with various embodiments.

In various embodiments, the ML agent 105 may be coupled to the performance management system 110 and service activation system 115. The performance management system 110 and service activation system 115 may be coupled to the network 120. The network 120 may include a plurality of network elements, through which telemetry information and attributes may be obtained by the performance management system 110 from the various protocol layers 125-140. The service activation system 115 may make changes to one or more attributes in the various layers 125-140.

In various embodiments, the ML agent 105 may include hardware, software, or hardware and software, both physical and/or virtualized. For example, in some embodiments, the ML agent 105 may refer to a software agent which may be deployed in either a centralized or distributed configuration. For example, in some embodiments, the ML agent 105 may be deployed on a centralized server, controller, or other computer system. In other embodiments, the ML agent 105 may be deployed in a distributed manner, across one or more different computer systems, such as servers, controllers, orchestrators, or other types of network elements. Accordingly, the ML agent 105 may be implemented on, without limitation, one or more desktop computer systems, server computers, dedicated custom hardware appliances, programmable logic controllers, single board computers, field programmable gate arrays (FPGA), application specific integrated circuits (ASIC), or a system on a chip (SoC).

In various embodiments, the ML agent 105 may be configured to optimize a QoE for one or more end users of the network 120. For example, QoE optimization may include optimizations of various network systems and services that may impact a user's perception of quality. Accordingly, QoE optimization may include, without limitation, one or more of TCP throughput optimization, UDP throughput optimization, packet/frame latency optimization, packet/frame loss optimization, topology discovered path selection optimization, traffic mix optimization, among other quantitative QoE metrics.

In performing QoE optimization, in some embodiments, the ML agent 105 may be configured to obtain various telemetry information and attribute about the network 120 from the performance management system 110. For example, the ML agent 105 may be configured to interface with the performance management system 110 via respective application programming interfaces (API) for various subsystems of the performance management system 110. In some embodiments, the ML agent 105 may be configured to obtain telemetry information from two different protocol layers 125-140 of the network 120. For example, the ML agent 105 may be configured to obtain telemetry information from a first protocol layer, such as the link layer, which in this case may be the Ethernet layer 130. The ML agent 105 may further be configured to obtain telemetry information from a second protocol layer, such as the networking layer, which in this example may be the IP layer 135.

In some embodiments, the ML agent 105 may further be configured to obtain performance metrics for a desired QoE parameter, such as TCP throughput. For example, for TCP throughput optimization, the ML agent 105 may further be configured to determine TCP throughput based on telemetry and performance metrics obtained from the transport layer 140, in this example TCP layer 140a. Thus, telemetry information may include, without limitation, both physical network function (PNF) and virtualized network function (VNF) telemetry and metrics, and performance metrics and telemetry from respective domain controllers, network elements, routers, gateways, customer premises equipment (CPE), and other network devices. In various embodiments, the ML agent 105 may be configured to interface with the performance management system 110 to obtain telemetry information and performance metrics associated with the respective QoE parameter. In further embodiments, the ML agent 105 may be configured to obtain telemetry information and performance metrics associated with the respective QoE parameter via performance testing tools. For example, for TCP performance, iPerf client software (or other testing software/tool) may be deployed as one or more VNFs in communication with the ML agent 105 via, for example, on one or more network devices of the network 120. TCP performance metrics may then be obtained via an iPerf API, by the ML agent 105, from the respective network devices of the network 120.

In various embodiments, the performance management system 110 may include various performance management APIs through which telemetry information and performance metrics may be obtained. For example, the performance management system 110 may provide an Ethernet layer 130 performance monitoring (PM) via a service operation, administration, and maintenance (SOAM) API (for example a Y.1731 PM API). Thus, the ML agent 105 may obtain Ethernet layer 130 telemetry information and performance metrics from the performance management system 110.

Accordingly, in the example of TCP throughput optimization, the ML agent 105 may determine TCP performance via tests performed via the iPerf API, and collect Ethernet layer 130 telemetry and performance metrics obtained via the SOAM API. Continuing with the example of TCP throughput optimization, the ML agent 105 may determine an optimal TCP throughput as a function of TCP performance (e.g., throughput, and packet loss), and Ethernet layer 130 performance metrics. Ethernet layer 130 performance metrics may include, without limitation, Frame Loss Ratio (FLR), Frame Transfer Delay (FTD), and Inter-frame Delay Variation (IFDV).

In various embodiments, the ML agent 105 may then, based on the measured TCP performance and Ethernet layer 130 performance metrics, make Ethernet layer 130 modifications to bandwidth profile (BWP), class of service (CoS), or both, via the service activation system 115. For example, the service activation system 115 may include, without limitation, service provisioning and activation APIs (e.g., metro ethernet forum (MEF) service configuration and activation (SCA) API, MEF service level agreement (SLA) API, etc.). Thus, the service activation system 115 may be configured to modify BWP attributes, CoS attributes, and other attributes associated with the TCP stack (e.g., send and receive buffer sizes, congestion window size (cwnd), etc.), and to provision and/or modify various network services and/or network devices accordingly. BWP may refer to limits placed on bandwidth utilization according to a service level agreement (SLA) between a service provider and a customer. Thus, the BWP may include attributes indicative of a bandwidth promised to a customer and provided to the customer. BWP attributes may include, without limitation, a committed information rate (CIR) and a maximum CIR, excess information rate (EIR) and a maximum DR, peak information rate (PIR), excess burst size (EBS), and committed burst size (CBS). CoS may refer to a class of service assigned to one or more services provided to the customer. For example, a class of service attributes may specify limits and thresholds for various performance metrics, such as a maximum frame delay (FD) and FLR.

The ML agent 105 may then observe TCP performance changes responsive to the modifications of the BWP, CoS, or both. Thus, the ML agent 105 may be configured to make service-specific modifications, via the service activations system 115, to the network 120 without knowing the underlying topology and/or individual components providing the service. The service activation system 115, which includes service provisioning and activation systems for various PNF and VNF may, in turn, identify and modify the appropriate individual components associated with a respective service. Thus, in various embodiments, the service activation system 115 may include an orchestrator, and various infrastructure control and management (ICM) systems. ICM systems may include, without limitation, network controllers (e.g., software defined network (SDN) controller, etc.), network function virtualization (NFV) orchestrators, an element management system (EMS), inventory management system, service management system, and network management system.

In various embodiments, the ML agent 105 may be configured to determine a reward (or cost) associated with the modification to the BWP and/or CoS. For example, in some embodiments, a reward may be based on an increase in TCP throughput and/or decrease in packet loss, or conversely a cost may be based on a decrease in TCP throughput and/or increase in packet loss, based on the modification to the BWP and/or CoS. In some embodiments, additional modifications to attributes, such as TCP send and receive buffer sizes, may be associated with a reward (or cost). Additionally, a reward (or cost) may be determined based on changes to Ethernet layer 130 performance metrics. For example, a reward may be associated with a decrease in FTD and/or FLR, and conversely a cost may be associated with increases in FTD and/or FLR, as a result of the changes to the BWP and/or CoS. In one example, the ML agent 105 may be configured to associate potential TCP throughput decreases with increased FLR. Additionally, costs may be determined for each parameter change caused by the modification to the BWP and/or CoS. For example, costs for a BWP and/or CoS parameter change may reflect real-world network costs incurred by the customer and/or service provider. These costs may reflect increased usage of networking, compute, and/or storage resources, physical and/or virtual.

Thus, the ML agent 105 may be configured to determine a subsequent action to take (e.g., modification to the BWP and/or CoS), based on the rewards and costs of the BWP and/or CoS modification. For example, the ML agent 105 may modify a BWP parameter, such as FLR, to increase TCP throughput. As described above, the ML agent 105 may associate increased FLR with decreased TCP throughput. Thus, a BWP and/or CoS may be modified to decrease FLR and increase TCP throughput. However, an increase of any BWP parameter may be directly proportional to an increase in costs. In this manner, TCP throughput may be optimized, in a real-world setting, in light of costs associated with any modifications to BWP and/or CoS parameters. Additional embodiments are described in greater detail with reference to FIG. 5 below.

Accordingly, in various embodiments, the network 120 may be an abstracted representation of a service provider network, and specifically, network elements associated with a service provided to a customer. From the perspective of the ML agent 105, the relevant inputs (e.g., telemetry information and performance metrics) are received via the performance management system 110 and/or service activation system 115, and changes to the network are made through the service activation system 115, without knowledge of the underlying network topology and individual network elements. Thus, the ML agent 105 may leverage existing systems deployed in the network 120 to optimize QoE for a specific service and/or application running on the network 120 by optimizing one or more QoE parameters, such as TCP throughput in the examples above.

Figure 2:
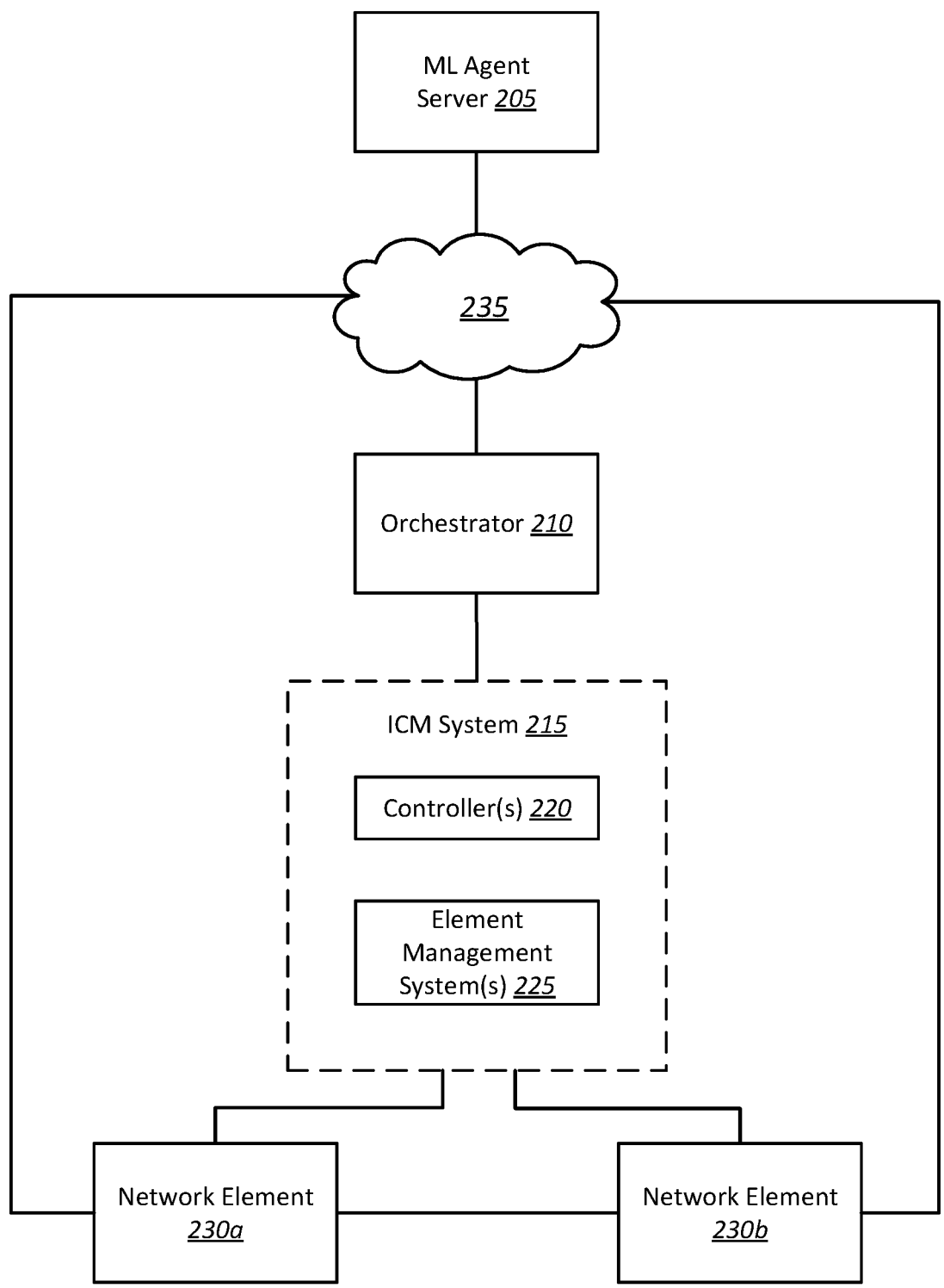
FIG. 2 is a schematic block diagram of a system for machine learning for QoE optimization, in accordance with various embodiments.

Several of the techniques described above, can be implemented using the system 200 illustrated by FIG. 2. It should be noted, however, that this system 200 can operate differently in other embodiments (including without limitation those described herein), and using a system different from that depicted by FIG. 2. FIG. 2 is a system block diagram of a system 200 for machine learning for QoE optimization, in accordance with various embodiments. The system 200 includes an ML agent server 205, network 235, orchestrator 210, ICM system 215, one or more controllers 220, one or more element management systems 225, a first network element 230a, and a second network element 230b (collectively "the network elements 230"). It should be noted that the various components of the system 200 are schematically illustrated in FIG. 2, and that modifications to the system 200 may be possible in accordance with various embodiments.

In various embodiments, the ML agent server 205 may be coupled to an orchestrator 210 via the network 235. The orchestrator 210 may be coupled to an ICM system 215. The ICM system 215 may include one or more controllers 220, and one or more element management systems 225. The ICM system 215 may, in turn, be coupled respectively to one or more network elements 230, including the first network element 230a and second network element 230b, the one or more network elements 230 comprising the network being optimized by the ML agent 105. The first network element 230a may further be coupled to the second network element 230b. Each of the first and second network elements 230a, 230b may further be coupled to the network 235.

In various embodiments, the ML agent server 205 may be a server computer configured to run one or more instances of a QoE optimizer application. For example, the QoE optimizer application may be a TCP throughput optimizer application. The QoE optimizer application, in various embodiments, may include an ML agent, various APIs and/or tools for collecting the relevant performance metrics and telemetry information (e.g., a SOAM API for Ethernet layer performance metrics, the iPerf (or other commercially available tool or software) client and API for TCP layer performance metrics), as well as various provisioning and activation APIs (e.g., an MEF SCA API, MEF SLA API, etc.) as described with respect to FIG. 1 above.

Alternatively, in some embodiments, the ML agent server 205 may be configured to provide a dedicated API, such as a representational state transfer (REST) API, for allowing both internal and external customers to invoke various functions of the QoE optimizer application. In yet further alternative embodiments, the ML agent server 205 may be configured to deploy instances of the QoE optimizer application to one or more respective orchestrators 210, or external customer systems, which may independently run the QoE optimizer application, either internally and/or externally, in a distributed and/or centralized configuration. Each instance of the QoE optimizer application may be configured to optimize one or more QoE parameters (such as TCP throughput optimization, UDP throughput optimization, packet/frame latency optimization, packet/frame loss optimization, topology discovered path selection optimization, traffic mix optimization, or other quantitative QoE metrics) for one or more specific applications, and for one or more specific customers. For example, a QoE optimizer application may be configured to optimize a single QoE parameter (e.g., TCP throughput optimization) for a single service (e.g., video streaming application) for a single customer. In other embodiments, the QoE optimizer application may be configured to optimize single or multiple QoE parameters for single or multiple services for single or multiple customers.

Accordingly, in various embodiments, the QoE optimizer application (including the ML agent) may be a microservice that can be invoked automatically as well as with an API by a customer (internal-operations and/or external). Telemetry tools like the iPerf tool and corresponding API may be deployed as a VNF via the Orchestrator, as well as a standalone application in a probe architecture.

In various embodiments, the orchestrator 210 may be configured to interface with an ICM system 215 to obtain telemetry information and performance metrics for the ML agent. For example, the ML agent may request telemetry information and/or performance metrics relevant to a specific QoE parameter from a first protocol layer. For example, for TCP throughput optimization, the ML agent may invoke, for example, an iPerf API function to obtain TCP throughput and packet loss metrics. Accordingly, in some embodiments, the orchestrator 210 may be configured to deploy instances of the necessary telemetry tools as virtualized instances to various network elements, such as the first and second network elements 230a, 230b. Accordingly, in some embodiments, the orchestrator 210 may be configured to deploy a telemetry tool to the first or second network element via the ICM system 215 The dynamic deployment of the iPerf tool (or other telemetry tool) as a VNF is described in greater detail with reference to FIG. 3 below.

In various embodiments, the iPerf tool may be configured to take active measurements of the maximum achievable bandwidth on an IP networks. The iPerf tool may support tuning of various parameters related to timing, buffers and protocols (TCP, UDP, SCTP with IPv4 and IPv6). For each test, the iPerf tool may report the bandwidth, loss, and other parameters. The iPerf API may provide both client and server activation and test results collection. Accordingly, iPerf tests may be configured to perform TCP throughput measurements.

The orchestrator 210 may further be configured to obtain, responsive to a request from the ML agent, telemetry information and performance metrics from a second protocol layer. Continuing with the example of TCP throughput optimization, the ML agent may invoke, for example, SOAM API functions to obtain Ethernet layer telemetry information and performance metrics such as FTD, FLR, and IFDV. Accordingly, the orchestrator 210 may be configured to pass API requests to the ICM system 215. The ICM system 215 may, in turn, be configured to respond to the API request by providing telemetry information and performance metrics collected from the network elements 230. In some examples, the SOAM API may include a G.8013/Y.1731 PM API, which may be responsible for the create, read, update, and delete (CRUD) operations of maintenance entity groups (MEG), MEG end points (MEP), and MEG intermediate points (MIP). In addition, the SOAM API (including G.8013/Y.1731 API) may be used for collection of one or more defined PM test results (such as those defined in Y.1731).

In various embodiments, the orchestrator 210 may further be configured to handle various service provisioning and activation requests from the ML agent. For example, the ML agent may invoke a service provisioning and activation API, such as a MEF SCA API and/or SLA API, to modify one or more BWP and/or CoS attributes. Accordingly, the orchestrator 210 may be configured to modify, via the ICM system 215, BWP and/or CoS attributes to the appropriate network elements 230. For example, in some embodiments, the orchestrator 210 may interface with one or more controllers 220, and/or one or more element management systems 225 to implement the appropriate changes. In some embodiments, the orchestrator 210 may interface with one or more domain controllers of the one or more controllers 220 of the ICM system 215, via a MEF network resource provisioning (NRP) API. In some examples, the MEF SCA and/or SLA API may provide CRUD operations in support of MEF services. The MEF service provisioning and activation API may be used to create and activate the MEF services, as well as to modify BWP and/or CoS attributes.

Accordingly, in various embodiments, to identify the network elements 230 relevant to a QoE parameter, application, service, or user, the orchestrator 210 may further be coupled an element management system 225. The element management system 225 may be configured to determine topology and inventory information. The orchestrator 210 may obtain the topology and inventory information via the one or more element management systems 225 and make modifications to individual network elements 230.

In various embodiments, as shown, the ICM system 215 may refer to the grouping of the various types of sub systems (e.g., one or more controllers 220, and one or more element management systems 225, for invoking domain specific MEF service modification requests, and domain specific telemetry information and performance metrics, respectively. The network elements 230 may include, accordingly, any network devices belonging to respective domains associated with the one or more services for which QoE is being optimized. For example, network elements 230 may include, without limitation, CPEs including universal CPEs (uCPE), network interface devices (NID), routers, switches, servers, gateways, modems, access points, network bridges, hubs, repeaters, and other network devices. Accordingly, in some examples, the first network element 230a may be a first CPE, and the second network element 230b may be a second CPE, each CPE associated with a respective customer. QoE optimization may be performed to improve QoE for one or more of the respective customers. For example, the QoE optimizer application (e.g., the ML agent) may be configured to optimize TCP throughput between the first network element 230a and second network element 230b for a given service (e.g., video streaming from the first network element 230a to the second network element 230b).

Figure 3:
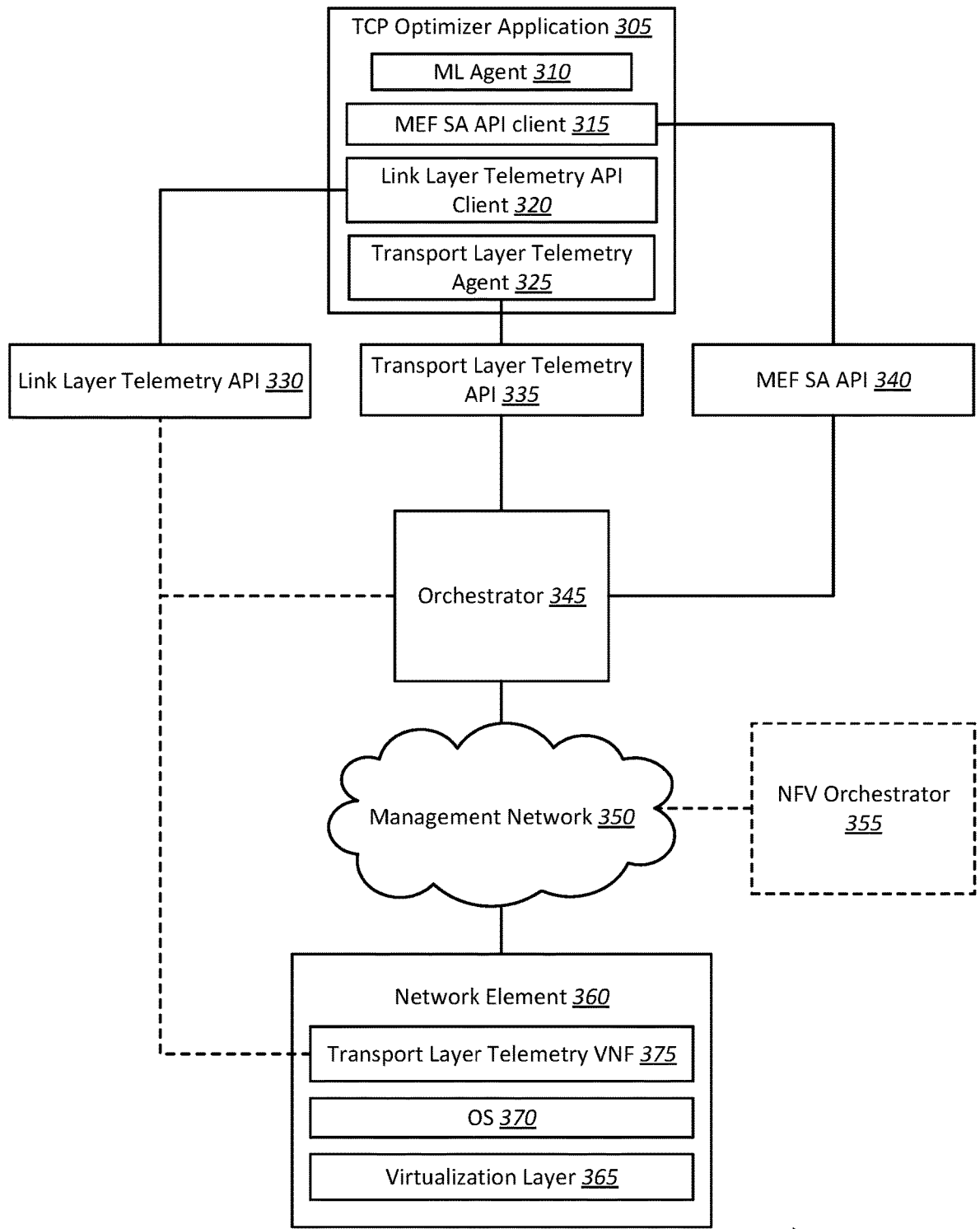
FIG. 3 is a schematic block diagram of a system for dynamically deploying an PM tools for QoE optimizations, in accordance with various embodiments.

The various deployment options for the QoE optimizer application and the dynamic deployment of telemetry tools described above may be implemented according to the system 300 illustrated in FIG. 3. It should be noted, however, that the system 300 can operate differently in other embodiments (including without limitation those described herein), and using a system different from that depicted by FIG. 3.

FIG. 3 is a schematic block diagram of a system 300 for dynamically deploying an PM tools for QoE optimizations, in accordance with various embodiments. The system 300 includes a TCP optimizer application 305, which may further include an ML agent 310, MEF SA client 315, link layer telemetry API client 320, and transport layer telemetry agent 325, link layer telemetry API 330, transport layer telemetry API 335, MEF SA API 340, orchestrator 345, management network 350, NFV orchestrator 355, and a network element 360 further including a virtualization layer 365, OS 370, and transport layer telemetry VNF 375. It should be noted that the various components of the system 300 are schematically illustrated in FIG. 3, and that modifications to the system 300 may be possible in accordance with various embodiments.

In various embodiments, the TCP optimizer application 305 may be coupled to the orchestrator 345. The TCP optimizer application 305 may be configured to interface with the orchestrator 345 via the link layer telemetry API 330, transport layer telemetry API 335, and MEF SA API 340. For example, in some embodiments, the TCP optimizer application 305 may include an ML agent 310, MEF SA API client 315, Link layer telemetry API client 320, and transport layer telemetry agent 325. The link layer telemetry API client 320 may interface with the orchestrator 345 via the link layer telemetry API 330. The link layer telemetry API client 320 may include refer to client software executable, as part of the TCP optimizer application 305, to obtain link layer telemetry information and performance metrics from the orchestrator 345. The link layer telemetry API client 320 may be configured to make specific API calls, via the link layer telemetry API 330, to obtain telemetry information and performance metrics from the orchestrator 345. In some embodiments, the link layer telemetry API client 320 may be configured to allow the ML agent 310 to make requests for link layer telemetry information and performance metrics. In some examples, the link layer telemetry API client 320 may be configured to interpret requests from the ML agent 310 to make respective link layer telemetry API 330 calls.

Similarly, the transport layer telemetry agent 325 may interface with the orchestrator 345 via the transport layer telemetry API 335. The transport layer telemetry agent 325 may include a software agent executable, as part of the TCP optimizer application 305, to obtain transport layer telemetry information and performance metrics from the orchestrator 345. For example, in various embodiments, the transport layer telemetry agent may be configured to allow the ML agent 310 to make requests for transport layer telemetry information and performance metrics. In some examples, the transport layer API agent 325 may be configured to interpret request from the ML agent 310 to make respective transport layer telemetry API 335 calls.

The MEF SA API client 315 may also interface with the orchestrator 345 via the MEF SA API 340. The MEF SA API client 315 may be configured to allow the ML agent 310 to make MEF SA modifications via the orchestrator 345. The MEF SA API client 315 may include a software client, as part of the TCP optimizer application 305, to make modifications to services and/or applications provided. For example, in some embodiments, the ML agent 310 may request changes to be made to BWP and/or CoS attributes. The MEF SA API client 315 may be configured to interpret the requests from the ML agent 310 to make appropriate calls to the MEF SA API 340 to implement the appropriate changes via the orchestrator 345.

In various embodiments, the TCP optimizer application 305 may be deployed in either a centralized or distributed configuration. The TCP optimizer application 305 may be hosted as a service on an ML agent server, as described above with respect to FIG. 2. Alternatively, the TCP optimizer application 305 may be deployed, for example, on the orchestrator 345, or dynamically invoked as an NFV on one or more network devices. Accordingly, the TCP optimizer application 305 may be deployed on a centralized server, controller, or other computer system, or in a distributed manner across one or more network devices (such as orchestrator 345).

In various embodiments, to obtain transport layer telemetry information and performance metrics, a PM tool (such as a client software, agents, etc.) for collecting and reporting transport layer telemetry information and performance metrics (for example, the iPerf application) may be deployed dynamically to one or more network elements, including network element 360. In some embodiments, transport layer telemetry information and performance metrics may include TCP layer telemetry information and performance metrics. Because the TCP stack is implemented in the OS, different versions of the tool or agent for collecting and reporting telemetry information and performance metrics may be deployed based on the type of OS used by a specific customer. Accordingly, in some embodiments, the orchestrator 345 may be configured to determine an OS being leveraged by a customer at a network element 360. In other embodiments, the orchestrator may be configured to deploy an OS image to a network element 360. For example, in various embodiments, the orchestrator 345 may have knowledge of underlying network topology and resources (including individual network devices and services, both physical and virtual). The orchestrator 345 may further be coupled to one or more ICM systems, via management network 350, to obtain telemetry information and performance metrics, and to make various modifications to the network, such as Ethernet layer changes to BWP attributes and/or CoS attributes. The orchestrator 350 may, in some embodiments, further utilize the one or more ICM systems to dynamically deploy telemetry tools to individual network elements. For example, in some embodiments, the one or more ICM systems may include an NFV orchestrator 355. The NFV orchestrator 355 may be configured to dynamically deploy VNFs, such as a transport layer telemetry VNF. In some embodiments, this may include an appropriate instance of a transport layer telemetry agent or tool for collecting and reporting transport layer telemetry information and performance metrics, based on the OS being utilized by the network element 360.

Accordingly, the network element 360 may include virtualization layer 365, OS 370, and transport layer telemetry VNF 375. In some embodiments, the OS 370 may be determined, or alternatively, a system image utilizing OS 370 may dynamically be deployed by NFV orchestrator 355. The transport layer telemetry VNF 375 may include a corresponding transport layer telemetry agent software for the respective OS 370, configured to collect and report transport layer performance metrics. In some examples, the NFV orchestrator 355 may be configured to dynamically deploy one, or both, of the OS 370 and transport layer telemetry VNF 375 to the network element 360. For example, in some embodiments, the orchestrator 345 may determine that the OS 370 of the network element 360 is a Ubuntu image. In some examples, the orchestrator 345 may then further request the NFV orchestrator 355 to deploy a transport layer telemetry VNF 375 configured for Ubuntu to the network element 360. In other embodiments, the orchestrator 345 may receive the appropriate transport layer telemetry VNF 375 from the NFV orchestrator 355, in this case a transport layer telemetry VNF 375 configured for Ubuntu. The orchestrator 345 may, in turn, deploy the transport layer telemetry VNF 375 to the network element 360. In yet further embodiments, the NFV orchestrator 355 may be implemented as part of the orchestrator 345. Accordingly, the orchestrator 345 may be configured to determine the OS 370 and deploy the appropriate VNF image (e.g., transport layer telemetry VNF 375) to the network element 360. It is to be understood that in other embodiments, the network element 360 may include other types of OS 370. Other OS 370 may include, without limitation, other Linux-based OS, Unix-based OS, Microsoft Windows, or other suitable OS known to those skilled in the art.

Figure 4:
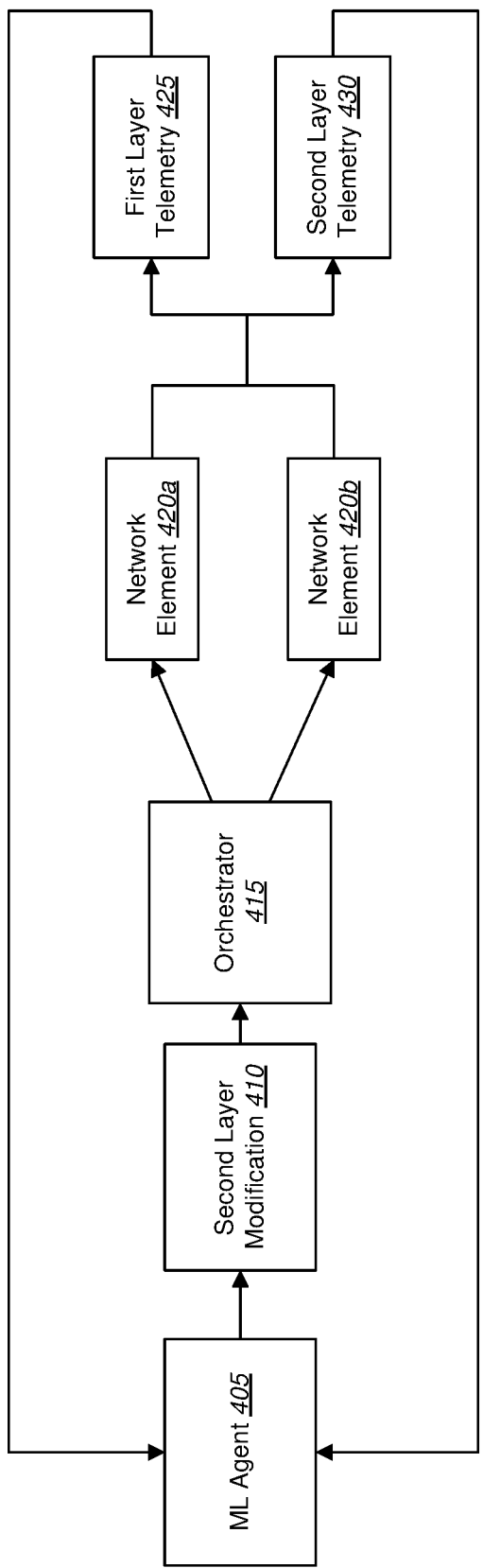
FIG. 4 is a functional block diagram of a system for machine learning for QoE optimization, in accordance with various embodiments.

FIG. 4 is a functional block diagram of a system 400 for machine learning for QoE optimization, in accordance with various embodiments. The system 400 includes an ML agent 405, a second layer modification 410, orchestrator 415, a first network element 420a, a second network element 420b, first layer telemetry 425, and second layer telemetry 430. It should be noted that the various components and functional blocks of the system 400 are schematically illustrated in FIG. 4, and that modifications to the system 400 may be possible in accordance with various embodiments.

In various embodiments, the ML agent 405 may be coupled to the orchestrator 415, which may in turn, be coupled to the first network element 420a and second network element 420b. The first and second network elements 420a, 420b may be coupled to the ML agent 405. In various embodiments, the ML agent 405 may be configured to make modifications to a protocol layer via the orchestrator 415. Thus, the ML agent 405 may make a second layer modification 410, and transmit instructions to make the second layer modification 410 to the orchestrator 410. For example, second layer modification 410 may include, without limitation, modification of various Ethernet layer attributes, such as BWP attributes and/or CoS attributes.

In various embodiments, the ML agent 405 may determine which second layer modifications 410 to make based on first layer telemetry 425 and second layer telemetry 430. As previously described with respect to FIGS. 1-3, in some examples, first layer telemetry 425 may include transport layer telemetry information and performance metrics, such as TCP throughput and packet loss. In some examples, second layer telemetry 430 may include Ethernet layer telemetry information and performance metrics, such as EIR, maximum EIR, EBS, CIR, maximum CIR, and CBS. Thus, the ML agent 405 may be configured to measure transport layer performance (e.g., TCP throughput), and make Ethernet layer modifications by changing BWP and/or CoS attributes.

In various embodiments, the orchestrator 415 may make the appropriate changes to individual components, such as the first network element 420a and second network element 420b, based on the changes to BWP and/or CoS attributes made by the ML agent 405. For example, in some embodiments, various services may be mapped to a CoS mapping, which may provide the required BWP and service performance attributes promised to a customer. In one example, to implement a network supporting guaranteed SLA services, end-to-end QoS capabilities are typically provided via traffic classification, policing, mapping to queues, scheduling, and shaping. These various mechanisms may be implemented, in an end-to-end manner, across user network interfaces (UNI), and both internal and external network-to-network interfaces (NNI). Thus, various traffic policing and shaping mechanisms may be modified in response to modification of BWP attributes and/or CoS attributes. For example, to provide a guaranteed CIR from end-to-end, by preventing or otherwise avoiding over-provisioning (e.g., over-subscribing) of CIR services. To avoid over-subscribing CIR services, at each potential congestion point, egress UNIs and multiprotocol label switching (MPLS) trunk queueing and scheduling should be configured appropriately, in this case via appropriate CoS, BWP, and network policy mapping. Differentiating between priority levels by traffic queues and schedulers allows customer IFDV, FLR, and FTD to be controlled by priority level assignments.

In various embodiments, once the second layer modification 410 has been implemented by the orchestrator 415, the first and second network elements 420a, 420b may be configured to generate first layer telemetry 425 and second layer telemetry 430, which may then be obtained by the ML agent 405. In some embodiments, the ML agent 405 may obtain the first and/or second layer telemetry 425, 430 via the orchestrator 415. In some examples, SOAM traffic may be used to measure second layer telemetry 430 (e.g., Ethernet layer). In some embodiments, a delay measurement message (DMM)/delay measurement reply (DMR) OAM message combination may be used to calculate the IFDV, FLR, and FTD metrics. For example, for Ethernet layer telemetry information, the SOAM API may be utilized to configure and activate maintenance end point (MEP) on network elements 420a, 420b. For example, in some embodiments, the orchestrator 415 may be configured to activate a PM session and SOAM frames may be initiated in a synchronous operation. PM telemetry may be collected by the ML agent 405 and/or the orchestrator 415 to determine FTD and FLR. In various embodiments, the orchestrator 415 and/or ML agent 405 may further be configured to generate and obtain first layer telemetry 425 (e.g., TCP performance information) via a transport layer telemetry tool (e.g., iPerf VNF) to perform various TCP tests and obtain telemetry information and performance metrics as described with respect to the above embodiments.

Accordingly, in various embodiments, the ML agent 405 may be configured to continuously measure metrics from a first protocol layer (e.g., TCP layer) and second protocol layer (e.g., Ethernet layer) to optimize a QoE parameter (e.g., TCP throughput). In various embodiments, the ML agent 405 may be configured to implement a reinforcement learning algorithm. For example, the ML agent 405 may incorporate a Markov decision process, which includes:

A set of states, "s";
A set of actions, "a";
Reward function, "r";
Policy, "H"; and
Value, v.

The set of actions taken may define the policy (H) and the rewards returned may define the value (v). The ML agent 405 may be configured to maximize the rewards by choosing between policy choices, given by the expression $E(r_t|\pi, s_t)$, for all possible values of s for time (t). In various embodiments, the actions (a) may be Ethernet layer parameter changes (e.g., second layer modification 410), such as BWP attribute and/or CoS attribute changes, made using the MEF Service Activation API. As previously described, BWP attributes may include maximum EIR, EIR, EBS, maximum CIR, CIR and CBS. CoS attributes may include priority level markings, such as a high class of service (H), medium class of service (M), and low class of service (L). The state (s) may be the measured Ethernet layer attributes (e.g., second layer telemetry 430) and TCP parameters (first layer telemetry 425) using the SOAM API and iPerf API, as previously described. The Ethernet layer performance metrics may include FTD, FLR, and IFDV. The TCP layer performance metrics may include TCP throughput and packet loss. The reward (r) may be based on an increase or decrease in TCP throughput, and/or a decrease or increase in packet loss, after an action (a) is taken. The reward (r) may further include Ethernet layer parameters FTD and FLR. A decrease in either FTD and FLR from the previous state may be considered a positive reward, and an increase in either FTD and FLR from the previous state may be considered a negative reward.

The ML agent 405 may further use the measured feedback from the TCP parameters (e.g., first layer telemetry 425), and Ethernet layer parameters (e.g., second layer telemetry 430), to determine the next action to take (e.g., second layer modification 410). In further embodiments, a cost may be associated with each parameter change caused by the second layer modification 410, indicative of real-world network parameter cost incurred by customers and/or service provider. For example, the ML agent 405 may increase BWP attributes to increase the TCP throughput. An increase in the BWP attributes may be directly proportional to an increase in cost (c).

In various embodiments, the ML agent 405 may leverage the following formula for TCP throughput:

$$TCP\ \text{Throughput} \leq \frac{MSS}{RTD * \sqrt{PE}}$$

where, MSS=Maximum Segment Size;
RTD=Round Trip Delay; and
PE=Probability of Error.

Accordingly, the TCP parameters of MSS, RTD, and PE, and the Ethernet layer parameters, FTD and FLR, will be observed and optimized by modifying VWP and/or CoS attributes. The modification of the BWP and/or CoS attributes, by the ML agent 405, may result in changes made by the orchestrator to network elements 420a, 420b.

In further embodiments, continuing with the example of TCP throughput optimization, the ML agent 405 may be configured to utilize a Q-learning algorithm to optimize TCP throughput. The ML agent 405 may be configured to generate a Q-table based on the following Bellman equation:

$$Q(s,a) = r + \gamma(\max(Q(s',a')))$$

Where the Q-value for a given state (s) and action (a) should represent the current reward (r) plus the maximum discounted ($\gamma$) future reward expected for the next state (s'). Thus, the discount variable ($\gamma$) allows weighting of possible future rewards relative to the present rewards.

The set of actions (a) may include, without limitation: increase EIR, decrease EIR, increase EBS, decrease EBS, increase CIR, decrease CIR, increase CBS, decrease CBS, change CoS (L) to CoS (M), change CoS (M) to CoS (L), change CoS (L) to CoS (H), change CoS (H) to CoS (L), change CoS (M) to CoS (H), and change CoS (H) to CoS (M). TCP optimal throughput may be given by where $TCP_{optThrpt} \leq \min\{Ci\}$, where Ci=link capacity at interface i. The actual optimal TCP throughput may be less than the maximum link capacity given the protocol overhead of TCP and IP.

In various embodiments, the ML agent 405 may be configured to use a value-based reinforcement learning algorithm to optimize TCP throughput given the associated cost. The optimal TCP throughput is a function of the set of link speeds, delay and loss between the two TCP state machines.

In an example, the theoretical optimal TCP throughput is equal to: $TCP_{max}=\min\{CIR, \min(link)\}$, where min(link) is equal to the minimum link speed of the path taken by TCP traffic.

The cost of an action (e.g., a BWP and/or CoS modification) may be given by the formula:

$$C=C_{EIR}(\Delta EIR)+C_{EBS}(\Delta EBS)+C_{CIR}(\Delta CIR)+C_{CBS}(\Delta CBS)+C_{CoS}(A_{CoS})$$

Total cost at each state (i) may be given by costs associated with each changed attribute caused by modifications to the BWP and/or CoS. Total cost at each state (i) equals cost(i):

$$\text{Cost}(i)=c_{cirmax}(i)+c_{cir}(i)+c_{cbs}(i)+c_{eirmax}(i)+c_{eir}(i)+c_{ebs}(i)+c_{cos}(i)$$

Where:

$$c_{cirmax}(i)=w_{cirmax}*\Delta cirmax(i)$$

$$c_{cir}(i)=w_{cir}*\Delta cir(i)$$

$$c_{cbs}(i)=w_{cbs}*\Delta cbs(i)$$

$$c_{eirmax}(i)=w_{eirmax}*\Delta eirmax(i)$$

$$c_{eir}(i)=w_{eir}*\Delta eir(i)$$

$$c_{ebs}(i)=w_{ebs}*\Delta ebs(i)$$

$$c_{cos}(i)=w_{cos};$$

where $w_{cos}$=x if CoS is changed from L to M; $w_{cos}$=y if CoS is changed from M to H; $w_{cos}$=z if CoS from L to H; $w_{cos}$=x' if CoS from M to L; $w_{cos}$=y' if CoS is changed from H to M; and $w_{cos}$=z' if CoS is changed from H to M.

In some embodiments, using the combination of maximization of TCP throughput and cost associated with making changes to BWP and/or CoS attributes, the ML agent 405 may be configured to determine that TCP throughput is optimal when Pareto optimality has been achieved. Thus, TCP throughput optimization may be a function of both TCP throughput, Ethernet layer performance metrics, and costs, as given by the following:

$$f_{TCPoptimization}(\ )=TCP_{Throughput}(t-1)+f_{PM}(\ )+f_{CM}(\Delta cir,\Delta cbs,\Delta eir,\Delta ebs,\Delta \cos)$$

In various embodiments, as will be apparent to those skilled in the art, the ML agent 405 may further be configured to prevent oscillations around an optimal condition, and to support convergence at the optimal condition. An example pseudo code for a reinforcement learning algorithm, according to some embodiments, is provided as follows:

```
initialize replay memory D
initialize action-value function Q with random weights
observe initial state s
repeat
```

```
    select an action a
        with probability e selection a random action
        otherwise select a = argmaxa' Q (s, a')
    carry out action a
    observe reward r and new state s'
    store experience <s, a, r, s' > in replay memory D
    sample random transitions <ss, aa, rr, ss' > from
        replay memory D
    calculate target for each minibatch transition
        if ss' is terminal state then tt = rr
        otherwise tt = rr + ymaxa' Q(ss', aa')
    train the Q network using (tt - Q(ss, aa))2 as loss
    s = s'
until terminated
```

Figure 5:
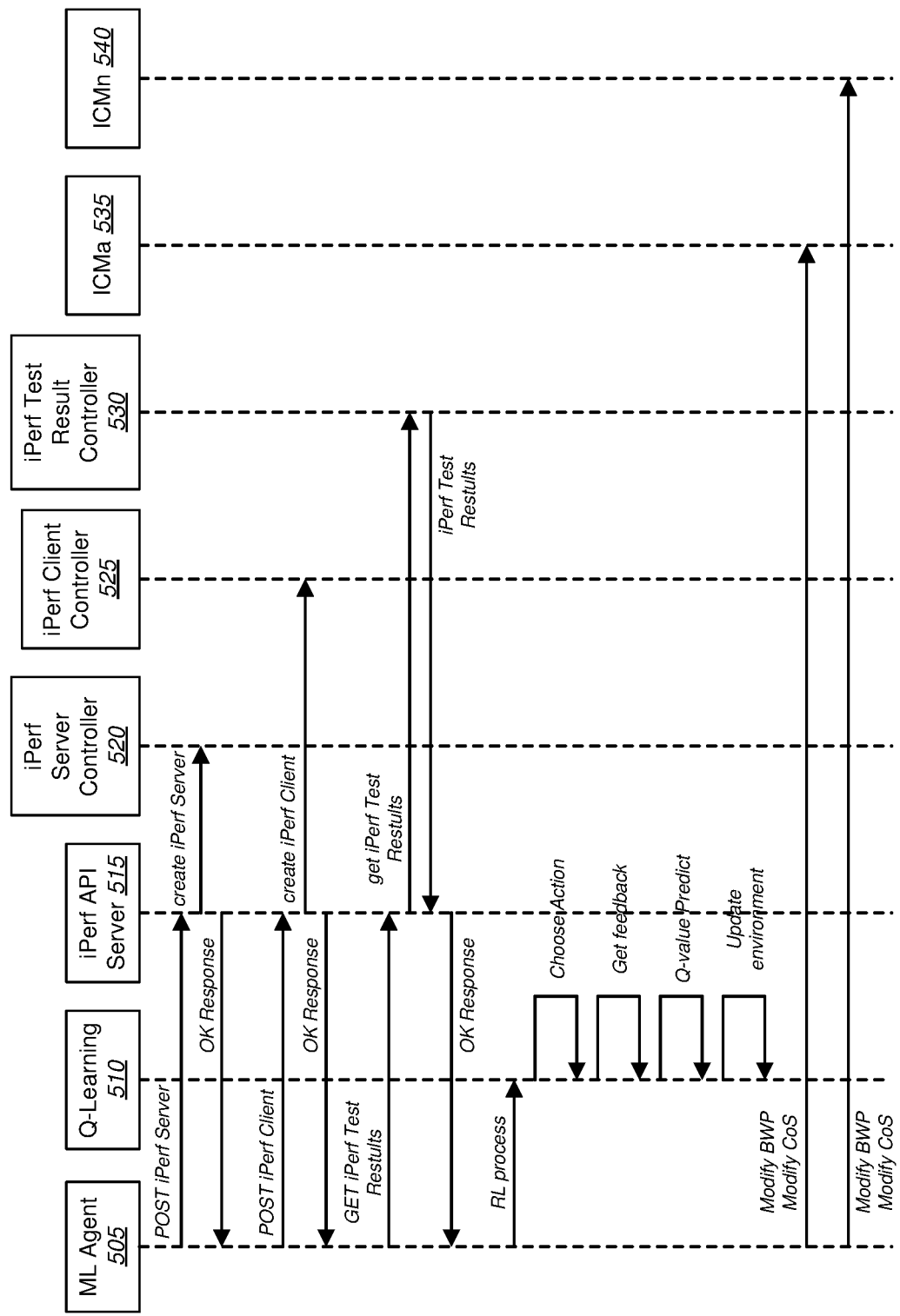
FIG. 5 is a sequence diagram of a process for QoE optimization by a machine learning system, in accordance with various embodiments.

FIG. 5 is a sequence diagram 500 of a process for QoE optimization by a machine learning system, in accordance with various embodiments. The sequence diagram 500 illustrates various objects and object interactions, including an ML agent 505, Q-Learning process 510, iPerf API server 515, iPerf server controller 520, iPerf client controller 525, iPerf test result controller 530, and a first ICMa 535, and nth ICMn 540. It should be noted that the various components of the sequence diagram 500 are schematically illustrated in FIG. 5 according to certain example implementations, and that modifications to the sequence diagram 500 may be possible in accordance with various embodiments.

In various embodiments, the sequence diagram 500 for the QoE optimization process may begin with ML agent 505 transmitting a POST iPerf Server command to the iPerf API server 520. In various embodiments, the iPerf PM tool utilize a server system and client system to perform various TCP tests. Accordingly, the POST command may cause the iPerf API server 515 to cause the iPerf server controller 520 to create an iPerf server instance. The iPerf API server controller 515 may respond with an acknowledgement, such as an OK response. The ML agent 505 may further issue a POST iPerf client command to the iPerf API server 515. In response, the iPerf API server 515 may cause the iPerf client controller 525 to create an iPerf client instance. The iPerf API server 515 may, similarly, respond with an acknowledgement, such as an OK response. Once the iPerf server and iPerf client have been created, one or more tests may be performed between the iPerf server system and iPerf client system. The results of the one or more tests may be reported to an iPerf test result controller 530. To obtain the test results, the ML agent 505 may issue a GET iPerf Test Results command to the iPerf API server 515. The iPerf API server 515 may, in turn, respond by requesting iPerf test results from the iPerf test result controller 530. The iPerf test result controller 530 may respond by providing iPerf test results to the iPerf API server 515, which may in turn provide an OK response to the ML agent 505 with the iPerf test results.

In various embodiments, the ML agent 505 may be configured to optimize TCP throughput based on the iPerf test results utilizing a reinforcement learning process, such as the Q-learning process 510. Accordingly, once the iPerf test results have been received, the ML agent 505 may invoke the Q-learning 510 reinforcement learning process. The Q-learning process 510 may begin by choosing an action based on the current state, as indicated by the iPerf test results, and a Q-table indicative of subsequent actions to take based on a current state. The Q-learning process 510 may then determine environmental feedback based on the current state and the selected action to take. Based on the current state and selected action, the Q-learning process 510 may predict a future Q-value of the next state. Next, the Q-learning process 510 may update the environment to reflect changes made by the selected action. The ML agent 505 may then, based on the selected action, issue a command to modify one or more BWP and/or CoS attributes to a a plurality of ICM systems, including a first ICM system (ICMa 535) to an nth ICM system (ICMn 540).

In various embodiments, as previously described, the ML agent 505 may be executed on a dedicated ML agent server computer, as part of an orchestrator, or may be deployed and executed from an external computer system, such as a customer's computer system. Similarly, the iPerf server controller 520 and iPerf client controller 525 may be one or more server computers, or part of the orchestrator, configured to deploy instances of iPerf server software and iPerf client software, to respective one or more network elements. The iPerf test result controller 530 may, similarly, be a dedicated server computer, or part of the orchestrator, to which the one or more network elements hosting the iPerf server and/or iPerf client may report test results. Furthermore, each of the ICM systems ICMa 535-ICMn 540 may correspond to a respective one or more ICM systems associated with a given domain, or for a given one or more services for which QoE is being optimized (e.g., TCP throughput).

Figure 6:
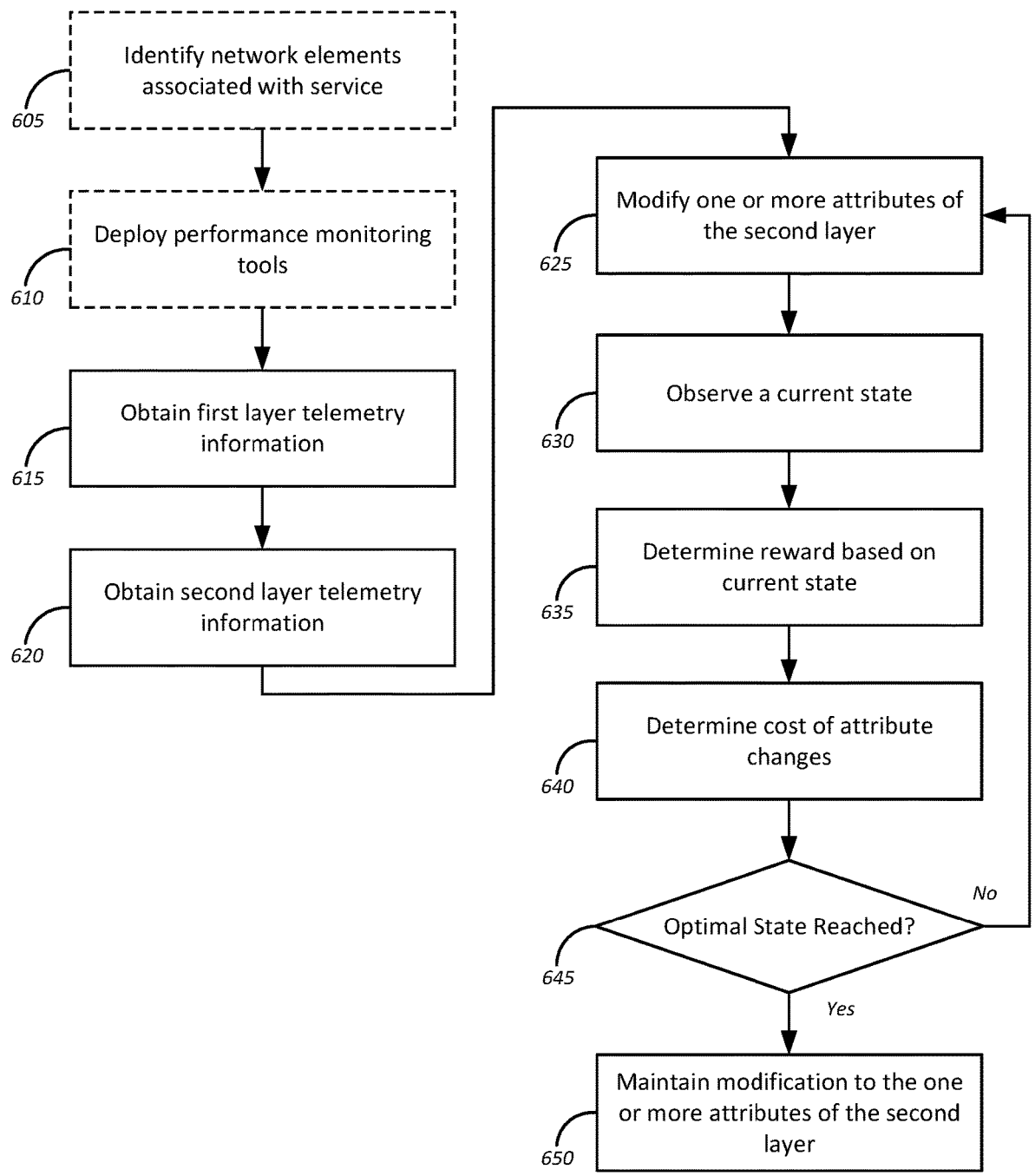
FIG. 6 is a flow diagram of a method for a machine learning system for QoE optimization, in accordance with various embodiments.

FIG. 6 is a flow diagram of a method 600 for a ML system for QoE optimization, in accordance with various embodiments. The method 600 begins, at block 605, by identifying network elements associated with a service. In various embodiments, a QoE optimizer application, including an ML agent, may be provided. The QoE optimizer application may be configured to optimize a QoE for one or more services associated with one or more customers. Accordingly, in some embodiments, an orchestrator may be configured to identify network elements associated with a service being optimized by the QoE optimizer application.

The method 600 may continue, at block 610, by deploying PM tools to the identified one or more network elements. In various embodiments, PM tools may include, without limitation, a software client or agent configured to collect and report telemetry information and/or performance metrics. In one example, the PM tool may include the iPerf tool, as previously described, configured to obtain and report transport protocol layer (e.g., TCP, UDP, SCTP with IPv4/IPv6) telemetry information and performance metrics.

At block 615, the method 600 continues by obtaining first layer telemetry information. In various embodiments, first layer telemetry information may refer to telemetry information (including performance metrics), obtained from a first protocol layer. In some embodiments, the first protocol layer may include, without limitation, a transport protocol layer, such as the TCP and/or UDP layer. Thus, in some embodiments, first layer telemetry information may be collected from one or more network elements via the PM tool. An ML agent may include a PM tool client that allows the ML agent to directly obtain telemetry information (e.g., test results) via a respective API, such as the iPerf API. In other embodiments, the first layer telemetry information may be obtained via the orchestrator, through which the ML agent may obtain test results from the PM tool.

At block 620, the method 600 continues by obtaining second layer telemetry information. In various embodiments, second layer telemetry information may refer to telemetry information (including performance metrics), obtained from a second protocol layer. In some embodiments, the second protocol layer may include, without limitation, a data link layer, such as an Ethernet layer. In some embodiments, second layer telemetry information may be obtained, by an ML agent, via an orchestrator. The orchestrator may be coupled to the one or more network elements, or one or more ICM systems coupled to the one or more network elements. Second layer telemetry information may, in turn, be obtained via one or more defined SOAM PM tests and/or SOAM API calls.

At block 625, the ML agent may be configured to modify one or more attributes of the second layer. In various embodiments, the one or more attributes of the second layer may refer to transport layer attributes. In some examples, this may include various Ethernet layer attributes, such as BWP and CoS. BWP may further include, for example, EIR, maximum DR, EBS, CIR, maximum CIR, and CBS. CoS may include attributes indicative of a low CoS (L), medium CoS (M), and high CoS (H). Thus, in some embodiments, the ML agent may be configured to instruct an orchestrator to modify one or more attributes of an Ethernet protocol layer for one or more services for one or more users. The orchestrator may be configured to identify the appropriate network elements for which to implement the Ethernet protocol layer changes. In some embodiments, changes may be made via respective ICM systems to which the orchestrator may be coupled. In some examples, the orchestrator and/or ML agent may be configured to invoke MEF service activation API calls, as previously described, to implement the appropriate Ethernet protocol layer changes at each of the respective network elements.

At block 630, the method 600 continues by observing a current state of first layer performance. In various embodiments, the QoE to be optimized may correspond to one or more metrics of first layer performance. Accordingly, in some embodiments, the QoE to be optimized may, for example, include TCP throughput. Accordingly, first layer performance may include TCP layer performance as given by TCP throughput. Thus, continuing with the example above, once the appropriate modifications have been made to Ethernet layer attributes, the ML agent may be configured to then observe the state of TCP layer performance. In some embodiments, the state of TCP performance may include TCP throughput and packet loss. In yet further embodiments, the ML agent may be configured to further observe second layer performance, as given by second layer telemetry information. Thus, Ethernet layer performance may also be observed, based on metrics such as FTD, FLR, and IFDV.

At block 635, the ML agent may be configured to determine a reward based on the current state of first layer performance. For example, in some embodiments, an increase in TCP throughput may be associated with a positive reward while a decrease in TCP throughput may be associated with a negative reward. In some embodiments, packet loss may also be associated with a reward, where a decrease in packet loss may be associated with a positive reward and an increase in packet loss may be associated with a negative reward. In some embodiments, the magnitude by which TCP performance is improved may be associated with a greater reward. In further embodiments, improvements in second layer performance may also be associated with a reward. For example, improvements in Ethernet layer performance, such as decreases in FLR, FTD, or IFDV, may be associated with a positive reward, and increases in FLR, FTD, or IFDV may be associated with a negative reward.

At block 640, the ML agent may further be configured to determine a cost associated with the changes to the one or more second layer attributes. For example, each of the changes to BWP and/or CoS attributes may be associated with a cost. In some embodiments, cost may be determined for an action may be determined as the sum of the cost of the change in EIR, EBS, CIR, CBS, and CoS. Total cost at each state may be given by the sum of the cost of changes to the maximum CIR, CIR (e.g., current CIR), CBS, maximum EIR, EIR (e.g., current EIR), EBS, and CoS.

At decision block 645, the ML agent may then be configured to determine whether an optimal state has been reached. The optimal state may refer to the state of a specific QoE. For example, the optimal state may refer to whether an optimal TCP performance (e.g., TCP throughput) has been achieved. In various embodiments, the ML agent may determine that an optimal TCP throughput has been achieved based, at least in part, on the reward and costs. In some embodiments, the ML agent may be configured to determine an optimal value through a reinforcement learning process, such as, for example, a Q-learning technique. For example, an optimal TCP through put may be determined based on a combination of a previous TCP throughput, a current reward associated with a current state, and a discounted future reward associated with a future state if an action is taken. In other embodiments, TCP throughput may be considered optimized when Pareto optimality has been reached. If an optimal state has not been reached, the method may return, to block 625, to modify one or more attributes of the second layer yielding a maximum expected future reward. Thus, the ML agent may continue to modify the one or more attributes of the second layer until convergence is reached for a given Q-value, or until Pareto efficiency has been achieved. If the optimal state has been reached, the method 600 may continue, at block 650, by maintaining the modification to the one or more attributes of the second layer and ending the TCP optimization process.

Figure 7:
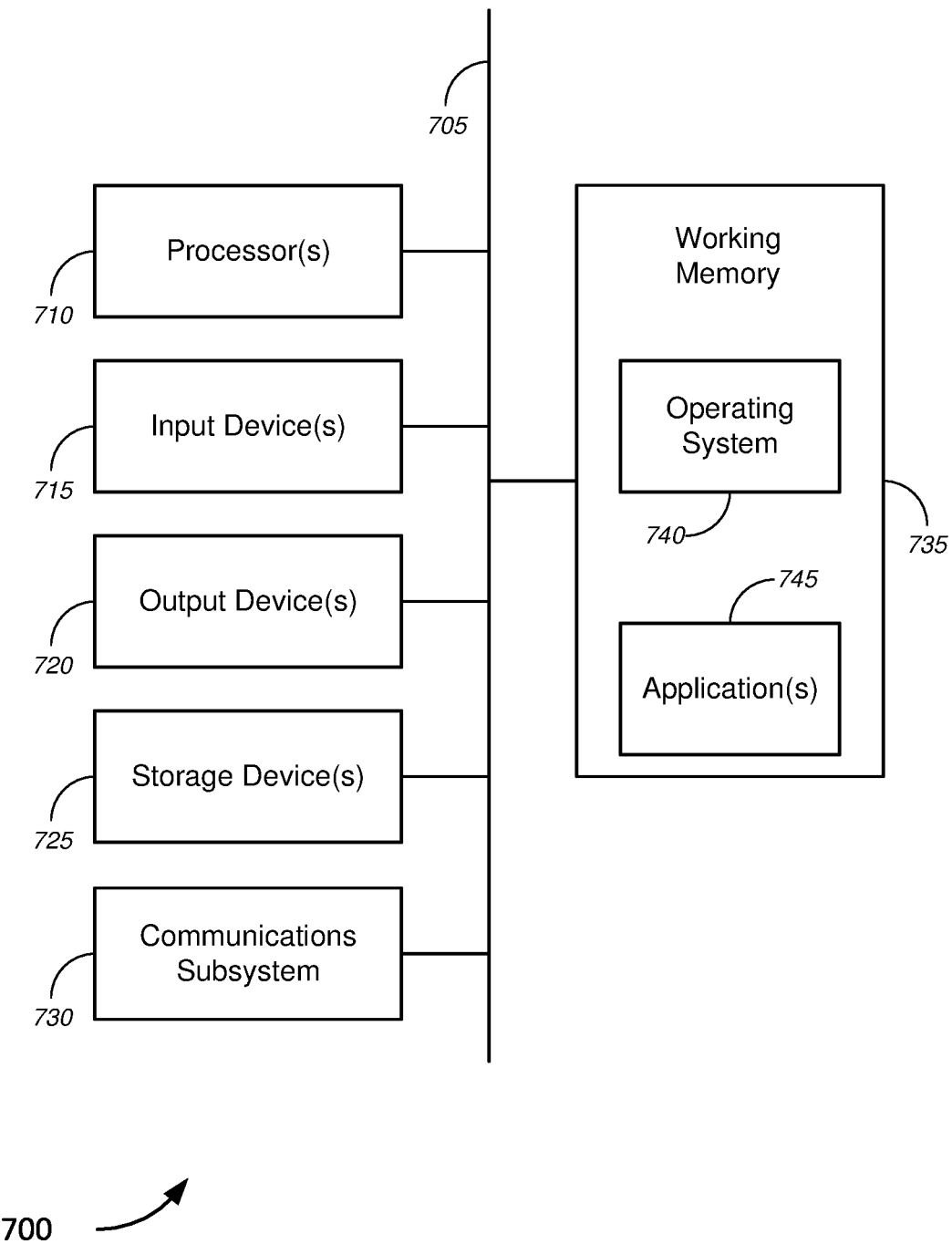
FIG. 7 is a schematic block diagram of a computer system for QoE optimization, in accordance with various embodiments.

FIG. 7 is a schematic block diagram of a computer system 700 for QoE optimization, in accordance with various embodiments. FIG. 7 provides a schematic illustration of one embodiment of a computer system 700, such as the ML agent server, orchestrator, one or more ICM systems, and one or more network elements, which may perform the methods provided by various other embodiments, as described herein. It should be noted that FIG. 7 only provides a generalized illustration of various components, of which one or more of each may be utilized as appropriate. FIG. 7, therefore, broadly illustrates how individual system elements may be implemented in a relatively separated or relatively more integrated manner.

The computer system 700 includes multiple hardware elements that may be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and microcontrollers); one or more input devices 715, which include, without limitation, a mouse, a keyboard, one or more sensors, and/or the like; and one or more output devices 720, which can include, without limitation, a display device, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or a LP wireless device as previously described. The communications subsystem 730 may permit data to be exchanged with a network (such as the network described below, to name one example), with other computer or hardware systems, between data centers or different cloud platforms, and/or with any other devices described herein. In many embodiments, the computer system 700 further comprises a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments (including, without limitation, various applications running on the various server, LP wireless device, control units, and various secure devices as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally receives the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a storage device 725 either before or after execution by the processor(s) 710.

Figure 8:
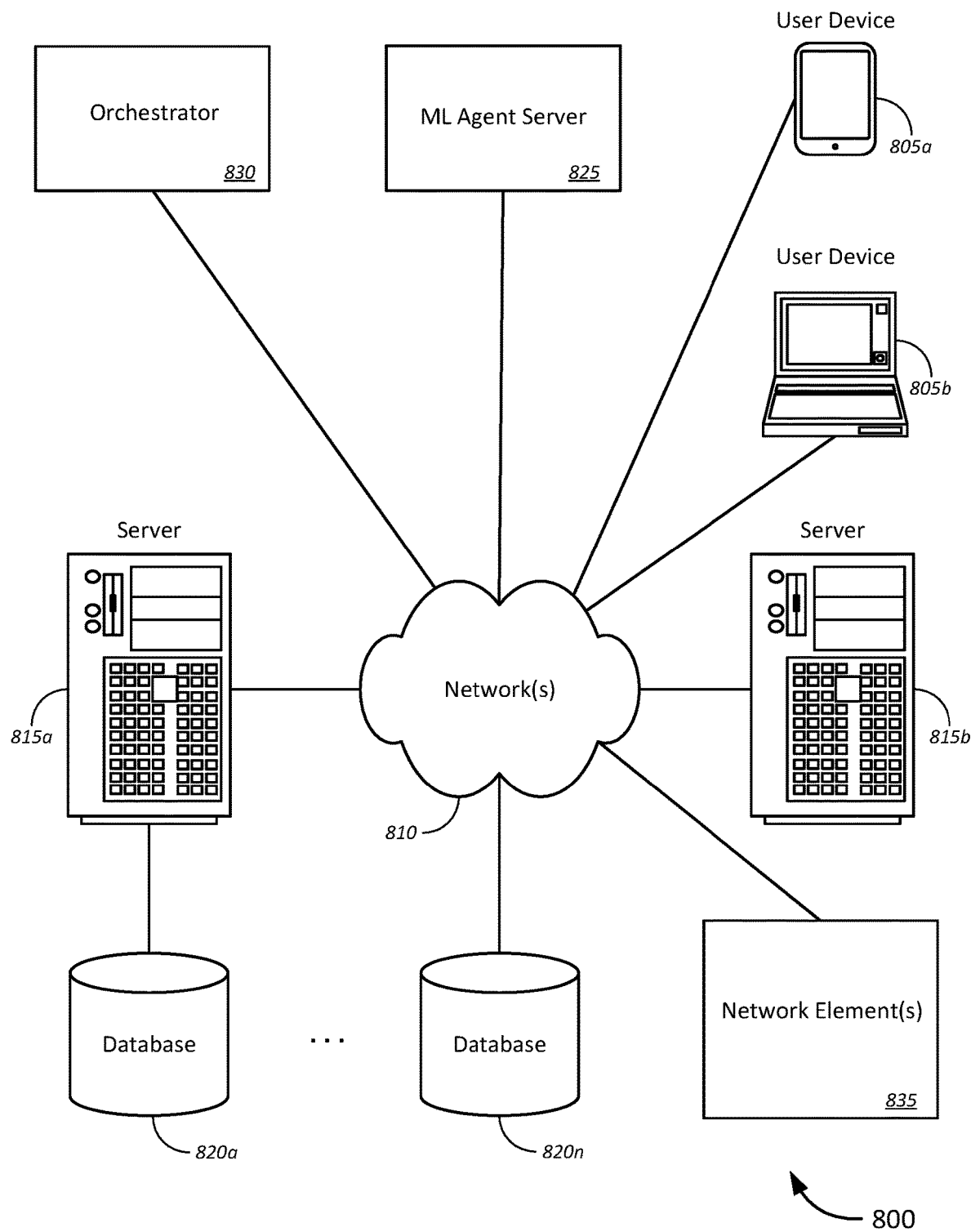
FIG. 8 is a block diagram illustrating a networked system of computing systems, which may be used in accordance with various embodiments.

FIG. 8 is a block diagram illustrating a networked system of computing systems, which may be used in accordance with various embodiments. The system 800 may include one or more user devices 805. A user device 805 may include, merely by way of example, desktop computers, single-board computers, tablet computers, laptop computers, handheld computers, and the like, running an appropriate operating system, which in various embodiments may include an ML agent, AI engine, and/or learning API as previously described. User devices 805 may further include external devices, remote devices, servers, and/or workstation computers running any of a variety of operating systems. In some embodiments, the operating systems may include commercially-available UNIX™ or UNIX-like operating systems. A user device 805 may also have any of a variety of applications, including one or more applications configured to perform methods provided by various embodiments, as well as one or more office applications, database client and/or server applications, and/or web browser applications. Alternatively, a user device 805 may include any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user devices 805, any number of user devices 805 may be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 810 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, management network, and/or or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications, programs, web-based services, or other network resources accessible by a client. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (or alternatively, user device 805). Alternatively, a database 820n can be remote from any or all of the computers 805, 815, 825, 830, 835 so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815, 825, 830, 835 can be stored locally on the respective computer and/or remotely, as appropriate.) In one set of embodiments, the database 820 may be a relational database configured to host one or more data lakes collected from various data sources, such as the managed object 825, user devices 805, or other sources. Relational databases may include, for example, an Oracle database, that is adapted to store, update, and retrieve data in response to SQL-formatted commands. The database might be controlled and/or maintained by a database server.

The system 800 may further include an ML agent server 825, orchestrator 830, and one or more network elements 835. Each of the ML agent server 825, orchestrator 830, and one or more network elements 835 may be coupled to the network 810. In some embodiments, the ML agent server 825 may be configured to provide an ML agent for QoE optimization. The ML agent server 825, in some examples, may be configured to dynamically deploy the ML agent to one or more of the orchestrator 830, servers 815, or user devices 805. In further embodiments, the ML agent server 825 may be configured to allow one or more of the user devices 805 to invoke the ML agent or otherwise cause an ML agent on the ML agent server 825 to perform QoE optimization as described in the embodiments above. Accordingly, the ML agent may be configured to obtain telemetry information about a network, such a network 810, from a first protocol layer and a second protocol layer. In some embodiments, telemetry information and performance metrics from a first protocol layer may be obtained, by the ML agent, form the one or more network elements 835. In other embodiments, first protocol layer telemetry information and performance metrics may be reported by the one or more network elements 835 to the orchestrator 830, from which the ML agent may obtain the first protocol layer telemetry information and performance metrics.

Based on the first and second protocol layer telemetry information and performance metrics, the ML agent may be configured to modify one or more attributes of the second protocol layer. In some examples, this may include modifications to BWP attributes and/or CoS attributes. In various embodiments, the modifications may be implemented via the orchestrator 830. For example, the orchestrator 830 may be coupled to the one or more network elements 835, or alternatively, to one or more respective ICM systems (not shown), which control service activation and provisioning functions over the respective network elements 835. Once the modifications to the second protocol layer attributes have been made, the ML agent may determine whether an optimal state for first protocol layer performance has been reached. In various embodiments, this may include assigning a reward to a current state based on first protocol layer performance (such as TCP throughput). Further rewards may be assigned to various second protocol layer performance metrics. Costs may further be assigned to the modifications of the one or more second protocol layer attributes.

Accordingly, an optimal state may be determined based, at least in part, on the rewards, costs, and in some examples, an expected future reward, as previously described with respect to the above embodiments.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

Example Embodiments

The following is a set of example embodiments for systems, apparatuses, and methods for ML QoE optimization, as described above. It is to be understood that various modifications and additions can be made to the embodiments below, and that other embodiments may selectively include or exclude individual features and/or combinations of features described below.

Example 1 includes a system comprising one or more network elements; an orchestrator in communication with the one or more network elements, the orchestrator configured to modify at least one of the one or more network elements; and a server comprising: a processor; and non-transitory computer readable media comprising instructions executable by the processor to: obtain, via the one or more network elements, telemetry information from a first protocol layer; obtain, via the orchestrator, telemetry information from a second protocol layer; modify, via the orchestrator, one or more attributes of the second protocol layer; observe, via the orchestrator, a state of first protocol layer performance; assign a cost associated with changes to each of the one or more attributes of the second protocol layer; and optimize the first protocol layer performance based, at least in part, on the state of first protocol layer performance and the cost associated with the changes to one or more attributes of the second protocol layer; wherein the orchestrator is further configured to modify the one or more attributes of the second protocol layer.

Example 2 includes the system of example 1, wherein the instructions are further executable by the processor to: identify, via the orchestrator, an operating system of at least one of the one or more network elements; and deploy, via the orchestrator, a performance monitoring tool compatible with the operating system, the performance monitoring tool configured to generate and report telemetry information from the first protocol layer.

Example 3 includes the system of any of examples 1-2, wherein the instructions are further executable by the processor to: modify, via the orchestrator, one or more of bandwidth profile attributes or class of service attributes, wherein orchestrator configured to identify the one or more attributes of the second protocol layer to modify based on the one or more bandwidth profile attributes or class of service attributes.

Example 4 includes the system of any of examples 1-3 further comprising an infrastructure control and management (ICM) system, wherein the ICM system includes at least one of a controller, second orchestrator, element management system, inventory management system, service management system, or network management system.

Example 5 includes the system of any of examples 1-4, wherein the first protocol layer is a transport layer indicative of a transport protocol used by the one or more network elements.

Example 6 includes the system of example 5, wherein the transport protocol is one of transmission control protocol (TCP) or user datagram protocol (UDP).

Example 7 includes the system of any of examples 1-6, wherein the second protocol layer is a data link layer indicative of a data link protocol by the one or more network elements.

Example 8 includes the system of example 7, wherein the data link protocol is Ethernet protocol.

Example 9 includes the system of any of examples 1-8, wherein the instructions are further executable by the processor to: determine a reward associated with the state based on first protocol layer performance, and second protocol layer performance; and wherein optimizing the first protocol layer performance is further based on the reward associated with the first protocol layer performance and second protocol layer performance.

Example 10 includes an apparatus comprising: a processor; non-transitory computer readable media comprising instructions executable by the processor to: obtain, via one or more network elements, telemetry information from a first protocol layer; obtain, via an orchestrator, telemetry information from a second protocol layer; modify, via the orchestrator, one or more attributes of the second protocol layer; observe, via the orchestrator, a state of first protocol layer performance; assign a cost associated with changes to each of the one or more attributes of the second protocol layer; and optimize the first protocol layer performance based, at least in part, on the state of first protocol layer performance and the cost associated with the changes to one or more attributes of the second protocol layer.

Example 11 includes the apparatus of example 10, wherein the instructions are further executable by the processor to: identify, via the orchestrator, an operating system of at least one of the one or more network elements; and deploy, via the orchestrator, a performance monitoring tool compatible with the operating system, the performance monitoring tool configured to generate and report telemetry information from the first protocol layer.

Example 12 includes the apparatus of any of examples 10-11, wherein the instructions are further executable by the processor to: modify, via the orchestrator, one or more of bandwidth profile attributes or class of service attributes, wherein orchestrator configured to identify the one or more attributes of the second protocol layer to modify based on the one or more bandwidth profile attributes or class of service attributes.

Example 13 includes the apparatus of any of examples 10-12, wherein the instructions are further executable by the processor to: determine a reward associated with the state based on first protocol layer performance, and second protocol layer performance; and wherein optimizing the first protocol layer performance further based on the reward associated with the first protocol layer performance and second protocol layer performance.

Example 14 includes the apparatus of any of examples 10-13, wherein the first protocol layer is a transport layer indicative of a transport protocol used by the one or more network elements.

Example 15 includes the apparatus of example 14, wherein the transport protocol is one of transmission control protocol (TCP) or user datagram protocol (UDP).

Example 16 includes the apparatus of any of examples 10-15, wherein the second protocol layer is a data link layer indicative of a data link protocol by the one or more network elements.

Example 17 includes the apparatus of example 16, wherein the data link protocol is Ethernet protocol.

Example 18 includes a method comprising: obtaining, via one or more network elements, telemetry information from a first protocol layer; obtaining, via an orchestrator, telemetry information from a second protocol layer; modifying, via the orchestrator, one or more attributes of the second protocol layer; observing, via the orchestrator, a state of first protocol layer performance; assigning a cost associated with changes to each of the one or more attributes of the second protocol layer; and determining whether first protocol layer performance is optimized based, at least in part, on the state of first protocol layer performance and the cost associated with the changes to one or more attributes of the second protocol layer.

Example 19 includes the method of example 18, further comprising: identifying, via the orchestrator, an operating system of at least one of the one or more network elements; and deploying, via the orchestrator, a performance monitoring tool compatible with the operating system, the performance monitoring tool configured to generate and report telemetry information from the first protocol layer.

Example 20 includes the method of any of examples 18-19, further comprising modifying, via the orchestrator, one or more of bandwidth profile attributes or class of service attributes; and identifying, via the orchestrator, the one or more attributes of the second protocol layer to modify based on the one or more bandwidth profile attributes or class of service attributes.

What is claimed is:

1. A system comprising:
   one or more network elements;
   an orchestrator in communication with the one or more network elements, the orchestrator configured to modify at least one of the one or more network elements; and
   a server comprising:
      a processor; and
      non-transitory computer readable media comprising instructions executable by the processor to:
         obtain, via the one or more network elements, telemetry information from a first protocol layer;
         obtain, via the orchestrator, telemetry information from a second protocol layer;
         modify, via the orchestrator, one or more attributes of the second protocol layer based on the telemetry information from the first protocol layer;
         observe, via the orchestrator, a state of first protocol layer performance responsive to the orchestrator modifying the one or more attributes of the second protocol layer;
         assign a cost associated with changes to each of the one or more attributes of the second protocol layer; and
         optimize the first protocol layer performance based, at least in part, on the state of first protocol layer performance and the cost associated with the changes to one or more attributes of the second protocol layer;
   wherein the orchestrator is further configured to modify the one or more attributes of the second protocol layer.

2. The system of claim 1, wherein the instructions are further executable by the processor to:
   identify, via the orchestrator, an operating system of at least one of the one or more network elements; and
   deploy, via the orchestrator, a performance monitoring tool compatible with the operating system, the performance monitoring tool configured to generate and report telemetry information from the first protocol layer.

3. The system of claim 1, wherein the instructions are further executable by the processor to:
   modify, via the orchestrator, one or more of bandwidth profile attributes or class of service attributes, wherein the orchestrator is configured to identify the one or more attributes of the second protocol layer to modify based on the one or more bandwidth profile attributes or class of service attributes.

4. The system of claim 1 further comprising an infrastructure control and management (ICM) system, wherein the ICM system includes at least one of a controller, second orchestrator, element management system, inventory management system, service management system, or network management system.

5. The system of claim 1, wherein the first protocol layer is a transport layer indicative of a transport protocol used by the one or more network elements.

6. The system of claim 5, wherein the transport protocol is one of transmission control protocol (TCP) or user datagram protocol (UDP).

7. The system of claim 1, wherein the second protocol layer is a data link layer indicative of a data link protocol by the one or more network elements.

8. The system of claim 7, wherein the data link protocol is Ethernet protocol.

9. The system of claim 1, wherein the instructions are further executable by the processor to:
   determine a reward associated with the state based on first protocol layer performance, and second protocol layer performance; and wherein optimizing the first protocol layer performance is further based on the reward associated with the first protocol layer performance and second protocol layer performance.

10. An apparatus comprising:

a processor;

non-transitory computer readable media comprising instructions executable by the processor to:
- obtain, via one or more network elements, telemetry information from a first protocol layer;
- obtain, via an orchestrator, telemetry information from a second protocol layer;
- modify, via the orchestrator, one or more attributes of the second protocol layer based on the telemetry information from the first protocol layer;
- observe, via the orchestrator, a state of first protocol layer performance responsive to the orchestrator modifying the one or more attributes of the second protocol layer;
- assign a cost associated with changes to each of the one or more attributes of the second protocol layer; and
- optimize the first protocol layer performance based, at least in part, on the state of first protocol layer performance and the cost associated with the changes to one or more attributes of the second protocol layer.

11. The apparatus of claim 10, wherein the instructions are further executable by the processor to:
- identify, via the orchestrator, an operating system of at least one of the one or more network elements; and
- deploy, via the orchestrator, a performance monitoring tool compatible with the operating system, the performance monitoring tool configured to generate and report telemetry information from the first protocol layer.

12. The apparatus of claim 10, wherein the instructions are further executable by the processor to:
- modify, via the orchestrator, one or more of bandwidth profile attributes or class of service attributes, wherein the orchestrator is configured to identify the one or more attributes of the second protocol layer to modify based on the one or more bandwidth profile attributes or class of service attributes.

13. The apparatus of claim 10, wherein the instructions are further executable by the processor to:
- determine a reward associated with the state based on first protocol layer performance, and second protocol layer performance; and wherein optimizing the first protocol layer performance further based on the reward associated with the first protocol layer performance and second protocol layer performance.

14. The apparatus of claim 10, wherein the first protocol layer is a transport layer indicative of a transport protocol used by the one or more network elements.

15. The apparatus of claim 14, wherein the transport protocol is one of transmission control protocol (TCP) or user datagram protocol (UDP).

16. The apparatus of claim 10, wherein the second protocol layer is a data link layer indicative of a data link protocol by the one or more network elements.

17. The apparatus of claim 16, wherein the data link protocol is Ethernet protocol.

18. A method comprising:
- obtaining, via one or more network elements, telemetry information from a first protocol layer;
- obtaining, via an orchestrator, telemetry information from a second protocol layer;
- modifying, via the orchestrator, one or more attributes of the second protocol layer based on the telemetry information from the first protocol layer;
- observing, via the orchestrator, a state of first protocol layer performance in response to the orchestrator modifying the one or more attributes of the second protocol layer;
- assigning a cost associated with changes to each of the one or more attributes of the second protocol layer; and
- determining whether first protocol layer performance is optimized based, at least in part, on the state of first protocol layer performance and the cost associated with the changes to one or more attributes of the second protocol layer.

19. The method of claim 18 further comprising:
- identifying, via the orchestrator, an operating system of at least one of the one or more network elements; and
- deploying, via the orchestrator, a performance monitoring tool compatible with the operating system, the performance monitoring tool configured to generate and report telemetry information from the first protocol layer.

20. The method of claim 18 further comprising:
- modifying, via the orchestrator, one or more of bandwidth profile attributes or class of service attributes; and
- identifying, via the orchestrator, the one or more attributes of the second protocol layer to modify based on the one or more bandwidth profile attributes or class of service attributes.

* * * * *